(12) United States Patent
Li

(10) Patent No.: US 10,480,723 B1
(45) Date of Patent: Nov. 19, 2019

(54) LED LIGHTS FOR FLUORESCENT FIXTURES

(71) Applicant: Siming Li, West Covina, CA (US)

(72) Inventor: Siming Li, West Covina, CA (US)

(*) Notice: Subject to any disclaimer, the term of this patent is extended or adjusted under 35 U.S.C. 154(b) by 140 days.

(21) Appl. No.: 15/789,967

(22) Filed: Oct. 21, 2017

Related U.S. Application Data

(60) Provisional application No. 62/438,595, filed on Dec. 23, 2016.

(51) Int. Cl.
*H05B 33/08* (2006.01)
*F21K 9/27* (2016.01)

(52) U.S. Cl.
CPC .......... *F21K 9/27* (2016.08); *H05B 33/0803* (2013.01)

(58) Field of Classification Search
CPC ........ F21K 9/27; H05B 33/08; H05B 33/0803
See application file for complete search history.

(56) References Cited

U.S. PATENT DOCUMENTS 8,896,207 B2* 11/2014 Thomas ............. H05B 33/0809
315/185 R
2004/0095078 A1* 5/2004 Leong ................ H05B 33/0809
315/291
2015/0351171 A1* 12/2015 Tao ........................ H05B 37/02
315/185 R

OTHER PUBLICATIONS

"Fluorescent Lamp#Construction", Wikipedia, pp. 8-9, 30 pgs, 2016.
"Ballast Wiring-Electrical 101", www.electrical101.com/ballast-diagrams.html, Internet, 1-2 pgs, 2 pgs, 2016.
"Sunco Lighting 10 Pack-T8 LED Tube Light 4 ft 48", 18W ... ". www.amazon.com/Daylight-Without-Fluorescent-Replacement . . . "Internet, Advertisement, pp. 6, 7,10,11, pp. 20 pgs, 2016.

* cited by examiner

*Primary Examiner* — Karabi Guharay
(74) *Attorney, Agent, or Firm* — Stan Collier, Esq.

(57) ABSTRACT

A pair of LED tubes are mounted in parallel in a conventional fluorescent light fixture having therein a standard fluorescent lamp ballast. As to each tube, a power line is input to a first end of the tube. Therein, a pair of reversed diodes receive the AC voltage and current. The high-frequency voltage output from the ballast is changed by the diodes into a DC voltage and current. A capacitor in parallel stabilizes the DC voltage and current making the power to the LED tube constant, and then by predetermined design a ratio of series and parallel connections of the LED retrofit lamp chips achieve the required power value and output. The passed DC current enters a pair of reversed diodes that allow the current to exit into the ballast.

1 Claim, 6 Drawing Sheets

T5 REPLACEMENT

LED LIGHTS FOR FLUORESCENT FIXTURES

CROSS REFERENCES TO RELATED APPLICATIONS

This application claims the benefit of the provisional patent application 62/438,595, filed Dec. 23, 2016, entitled "LED Lights for Fluorescent Fixtures", by Siming Li.

Reference to Federally sponsored research or development: NA

Reference to joint research agreements: NA

Reference to Sequence Listing: NA

BACKGROUND OF THE INVENTION

Field of the Invention

The present invention relates generally to lights, and, in particular, relates to replacement lights, and, in greater particularity, relates to LED replacement lights for conventional/fluorescent fixtures.

Description of the Prior Art

Typically, fluorescent tubes because of their unique design usually require a ballast transformer. The tubes come in various shapes and sizes, such as T5, T8 and T12. Replacement tubes using LEDs are available and typically sold such as https://www.amazon.com/Daylight-Without-Fluorescent-Replacement-Connection/dp/B0163D7CP8/ref=sr_1_1?ie=UTF8&qid=1482420827&sr=8-1&keywords=led+fluorescent+replacement+lamps. It is also possible to replace the ballast with LED drivers. In another alternative, each LED bulb is self-ballasted and this would not need an external driver, but then the external ballast would be removed in the fixture.

Fluorescent lamps have become very successful light sources. They are used on a large scale. In fact, more than 60% of today's artificial light is produced by fluorescent lamps. However, in recent years, LED light-emitting technology has developed rapidly, and because of the high efficiency of LED retrofit lamps and their long service life, the LED fluorescent replacement lamp has become more popular.

This solution can allow LED lights to replace fluorescent lamps for lighting, improving the life span of the LED lights, but this solution's LED load only carries out the role of a series connection. The ballast current and voltage that it can adapt to is limited, many models of fluorescent tubes are not compatible and not able to achieve energy saving; the most important thing is that the solution is very complex, difficult to achieve, high in cost, and cannot be widely used in an actual production process.

Accordingly, there is a need for an improved LED replacement tube that operates by conventional ballasts.

SUMMARY OF THE INVENTION

Referring to FIG. 1, a pair of LED tubes 10 and 12, only 10 shown in detail, are mounted in parallel to the standard fluorescent lamp ballast 14 in a fixture 13. As to each tube 10 or 12, a power line 16 is input to a first end 18 of the tube 10. The A/C voltage and current is input into a pair of reversed diodes 20 and 22 for rectification of the high frequency output from the ballast 14. A capacitor 24 acting as a filter is parallel connected to the diodes 20 and 22. The passed DC current is stabilized by the capacitor 24 that powers the LED lamp 30 and exits through another pair of diodes 34, acting as a bridge rectifier into the ballast 14. This is repeated for each tube mounted in the fixture having one ballast therein. By adjusting the LED beads/chips 30, (shown as dashes with initial diodes shown, two groups, each group is a series of LED chips, and these two groups are mounted in parallel. The number of LED chips in both is determined by the tube being replaced) in parallel and series combination, the output can be adjusted to match a particular ballast. In this regard, the LED retrofit lamp can replace T5, T8, and T12 fluorescent lamps, for example.

A LED retrofit lamp, FIG. 2, is described in greater detail in the specification and comprises a LED load 50 that is arranged in series (LS) 50; a first lamp end circuit 11 comprises a first lamp pin (LP1) 52 and a second lamp pin (LP2) 54 connecting to the first lamp connection terminal 60 that connects to the high frequency fluorescent lamp ballast, not shown; a first rectifier 111 with D1, D2, 56, 58, respectively, is fitted with at least one output terminal coupled to the first and second input terminals 60 and 68 respectively, of the LED load 64, the first rectifier 111 comprises at least two diodes 56 and 58, one of which is branched by a first capacitor (C1) 112, and a second lamp end circuit 12, comprising: a first output terminal 66 for connecting to the third lamp pin (LP3) 68 and a fourth lamp pin (LP4) 80 of the second lamp end 12 connecting to the terminal of the high frequency fluorescent lamp ballast, not shown. Another pair of reversed diodes D3 72 and D4 74 act as a bridge with the other set of diodes D1 56 and D2 58. The LED load 64 is adjusted by various combinations of parallel and series LED units as will be more fully detailed herein.

Compared with the prior technology, this invention uses an LED retrofit lamp to replace a fluorescent lamp tube, by removing the fluorescent lamp tube from the fluorescent lamp holder, and inserting an LED load with fluorescent lamp ballast into the lamp holder, the first rectifier 56 and the second rectifier 121 forming a bridge, and thus converting the high-frequency alternating current into high-frequency direct current; at this time the voltage is very unstable, thus it is filtered through the filter circuit 112 across the load to achieve voltage regulation. Different ballasts give different voltage values; at this point the LED load uses different series and parallel connections, thereby achieving the present invention in which the LED load can replace any type of fluorescent lamp. The LED retrofit lamp of the present invention can be used along with the conventional fluorescent lamp ballast where the ballast changes the current and voltage as the light intensity of the LED load changes.

In this invention, the light-emitting diode chip/bead in the LED load is small in resistance, can withstand voltage changes, and has good stability and a long life span. The same light brightness conditions, and retaining the same ballast in the fluorescent lamp is desired when replacing the lamp tube with the LED retrofit lamp 70, the new type LED lamp that replaces both the fluorescent tubes may save manpower as well as reduce product costs. At the same time, under the same light brightness conditions, this LED lamp invention can save more than 50% of electricity, which is beneficial to saving energy and helping the environment.

In order to achieve the above objective, the present invention is an LED retrofit lamp that replaces the original fluorescent lamp in the fluorescent lamp holder for illumination, and connects to the first and second connection terminals of the LED load.

The ballast on the fluorescent lamp holder connects to the first and second connection terminals and makes a high-frequency, high-voltage constant current source, changes the input voltage current value into the LED load, and matches with the LED lamp to adjust the light output.

The first end of the lamp circuit comprises the first and second lamp pins that are used to connect to the ballast's first lamp connection terminal, the first rectifying circuit for converting the alternating current output from the ballast into a direct current and a filter circuit for regulating the unstable voltage output from the ballast. One end of the first rectifying circuit has a coupling with the connection wires of the first and second lamp pins, the other end of the first rectifying circuit has a coupling to the connection wire of the LED load's first and second connection terminals, one end of the filter circuit has a coupling with a connecting wire connected to the first connecting terminal of the LED load, the other end of the filtering circuit is coupled with a connecting wire to the second connecting terminal of the LED load.

The second end of the lamp circuit comprises the third and fourth lamp pins for connecting to the ballast's second lamp connection terminal and a second rectifying circuit for converting the alternating current output from the ballast into a direct current. One end of the second rectifier circuit is coupled with a connecting wire to the third and fourth lamp pins, and the other end of the second rectifier circuit is coupled to the LED load's first and second connection terminals.

The LED load allows multiple LED lamps to be connected in series, and then these multiple connected series of LED lamps are electrically connected in parallel, the parallel LED lamp group connects to the connection wire of the first connection terminal, the other end of the LED series group connects to the connection wire of the second connection terminal.

There is a first rectifier circuit comprising of a first and second diode. The input end of the said first and second diodes are connected to the first and second lamp pins, the output end of the first and second diodes are connected to the first connection terminal of the LED load; the input terminal of the second diode is connected to the second connection terminal of the LED load, and the output end of the second diode is connected to the first and second lamp pins.

The filter circuit includes a capacitor; one end of the capacitor is connected to the first connection terminal of the LED load, and the other end of the capacitor is connected to the second connection terminal of the LED load.

The second rectifier circuit comprises a third and fourth diode, the input end of the third diode is connected to the third and fourth lamp pins, and the output end of the third diode is connected to the first connection terminal of the LED load; the input end of the fourth diode is connected to the second connection terminal of the LED load, the output terminal of the fourth diode is connected to the third and fourth lamp pins.

The conventional ballast for parallel fluorescent tubes has a black wire, hot input, and a white wire, common input. On the output side of the ballast, there are two blue wires that connect to the input end of the lamp, and a red wire that connects to the output ends of the lamps.

The invention also discloses a method for transforming a fluorescent tube directly with a high frequency ballast using an LED lamp, comprising the following steps:

1. According to the source of the constant current output of the fluorescent lamp ballast, one calculates how to connect the LED tubes in parallel with the LED given load, and arrange the LED load layout.

2. Arrange the first rectifying circuit, second rectifying circuit, and a filtering circuit, identify the first, second, third and fourth lamp pins, and connect the four sets of lamp pins respectively with the lamp connection terminals of the ballast.

3. Arrange the first rectifying circuit between the first lamp pin, second lamp pin and the LED load; arrange the second rectifying circuit between the third lamp pin, the fourth lamp pin and the LED load; and arrange the filter circuit between the first rectifier circuit and the LED load; and 4. Remove the fluorescent lamp tube on the fluorescent lamp holder, and insert first lamp, the second lamp, the third lamp and the fourth lamp pins into the corresponding lamp socket, enabling the LED load and ballast within the fluorescent lamp ballast to match and work.

The invention also discloses the application of an LED lamp that can replace a fluorescent tube and work directly with high frequency ballast, for use in the process of converting T5 fluorescent lamps, T8 fluorescent lamps, T10 fluorescent lamps and T12 fluorescent lamps into LED lamps.

This invention also discloses an LED retrofit lamp that can replace a fluorescent tube and work directly with high frequency ballast which is applicable in transforming LED fluorescent light into LED Plant Grow Fill Light, fluorescent advertising light into LED advertising light, fluorescent beauty and commercial light into LED beauty and commercial light, fluorescent home lighting into LED home lighting, fluorescent mining lamps into LED mining lamps, and fluorescent heterogeneous lamps into LED heterogeneous lamps.

The present invention is directed at LED tubes used, in particular, for plant growth.

It is an object of the present invention to provide a replacement tube for fluorescent lights tubes;

It is another object of the present invention to provide a LED tube to replace fluorescent light tubes and using the same fluorescent ballast in the fixture;

It is a further object of the present invention to provide a LED tube that has a substantially longer life;

It is still a further object of the present invention to provide a LED tube that is energy efficient as compared to the fluorescent tube, with a targeted light spectrum for plant growth;

It is still another object of the present invention to provide a LED tube that matches the particular ballast; and It is still another object of the present invention to provide a LED tube that uses diodes and a capacitors to convert the AC power to DC power to operate the LED chips/lamps without internal ballasts.

It is still further object of the present invention to provide a LED tube that can adjust the load by varying the combination of series and parallel LED chips.

These and other objects, features, and advantages of the present invention will become more readily apparent from the attached drawings and the detailed description of the preferred embodiments, which follow.

BRIEF DESCRIPTION OF THE DRAWINGS

Like reference numerals refer to like parts throughout the several views of the drawings.

DETAILED DESCRIPTION OF THE PREFERRED EMBODIMENTS

Figure 1:
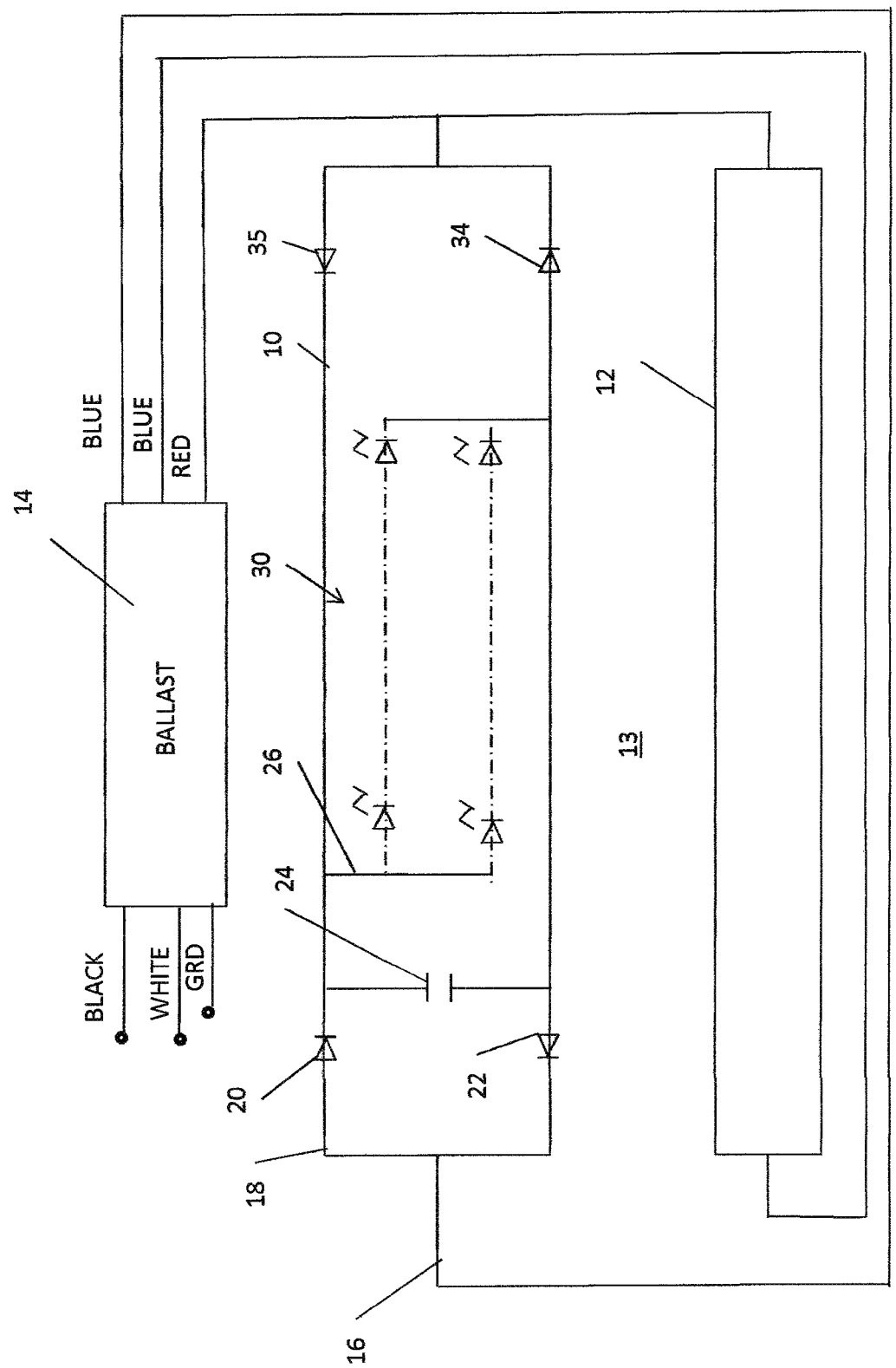
FIG. 1 is a schematic diagram of a pair of LED retrofit lamps in a fluorescent fixture.

Referring to FIG. 1, a pair of LED tubes 10 and 12 are mounted in parallel to the standard fluorescent lamp ballast 14. As to each tube 10 or 12, a power line 16 is input to a first end 18 of the tube 10. As to the electronic device therein, a pair of reversed diodes 20 and 22 receive the AC voltage and current. A capacitor 24 is parallel connected to the diodes 20 and 22 to limit the voltage and current. The passed DC current enters the LED lamps 30, i.e., LED chips, that are in a predetermined arrangement for the adjustment of wattage, voltage, and current and exits through another pair of diodes 34 and 35 into the external ballast 14. This is repeated for each tube mounted in the fixture having one ballast in the fixture.

Further, the LED chips are organized in different quantities in series and groups to obtain different wattages to match fluorescent tube lumen output to the retrofit lamp.

Figure 2:
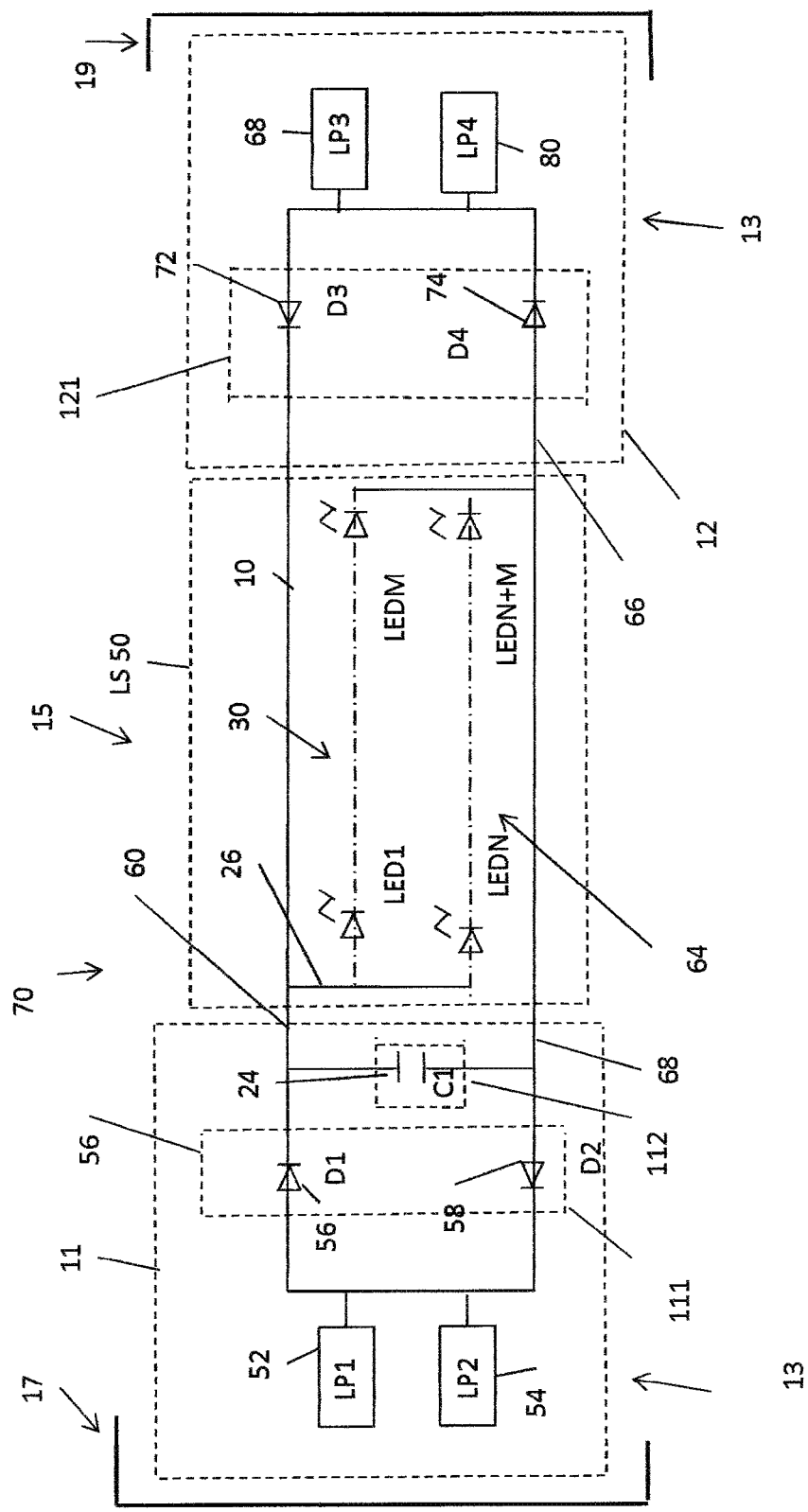
FIG. 2 is a schematic view of a ballast with an LED tube mounted in parallel in a fixture of the present invention with M and N shown on the LED loads.
Figure 3:
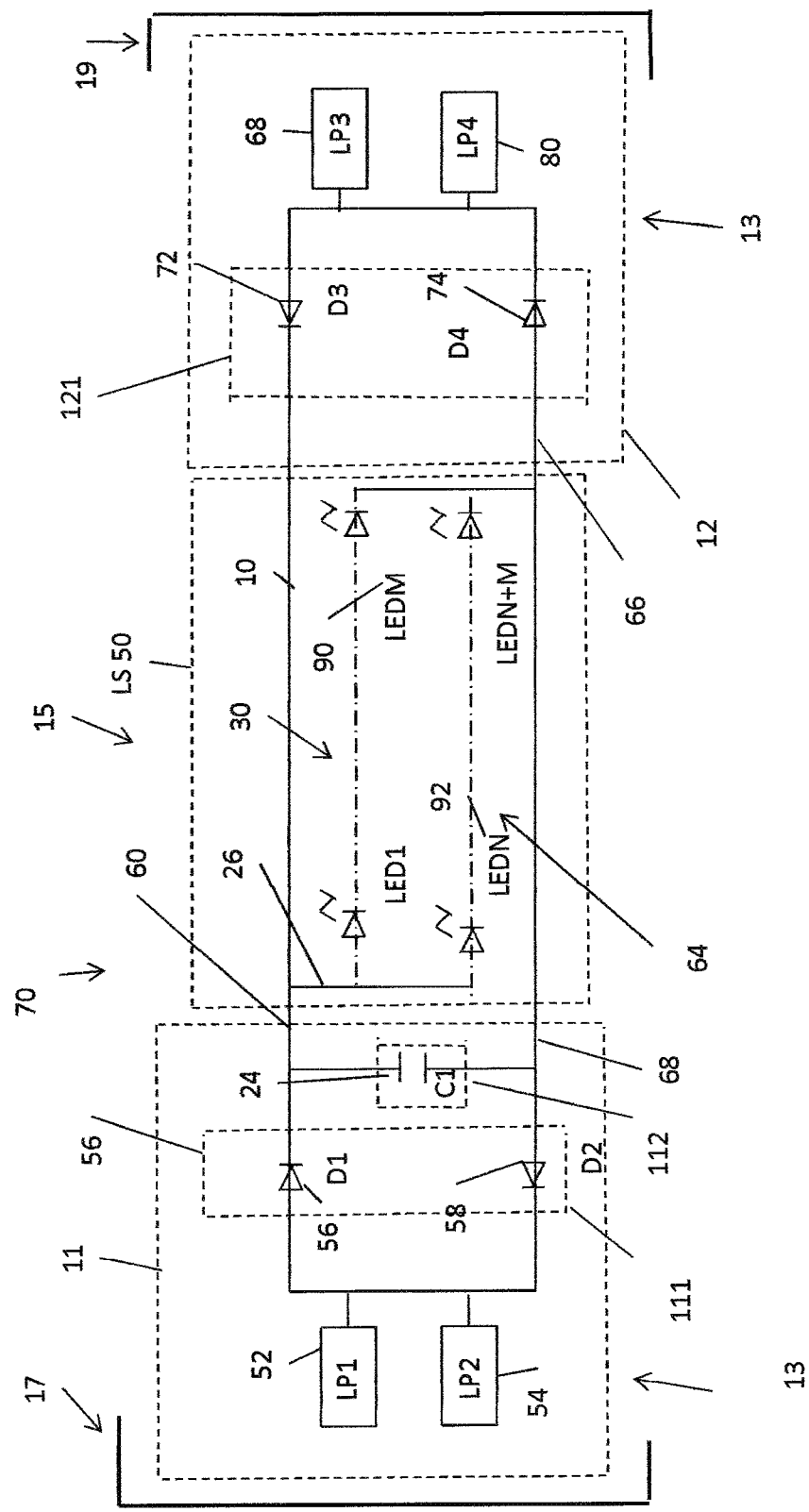
FIG. 3 is a schematic diagram of the circuit of an LED retrofit lamp according to a first embodiment of the present invention, generally with the letters M and N on the LED loads, with M being 10 and N being 2.
Figure 4:
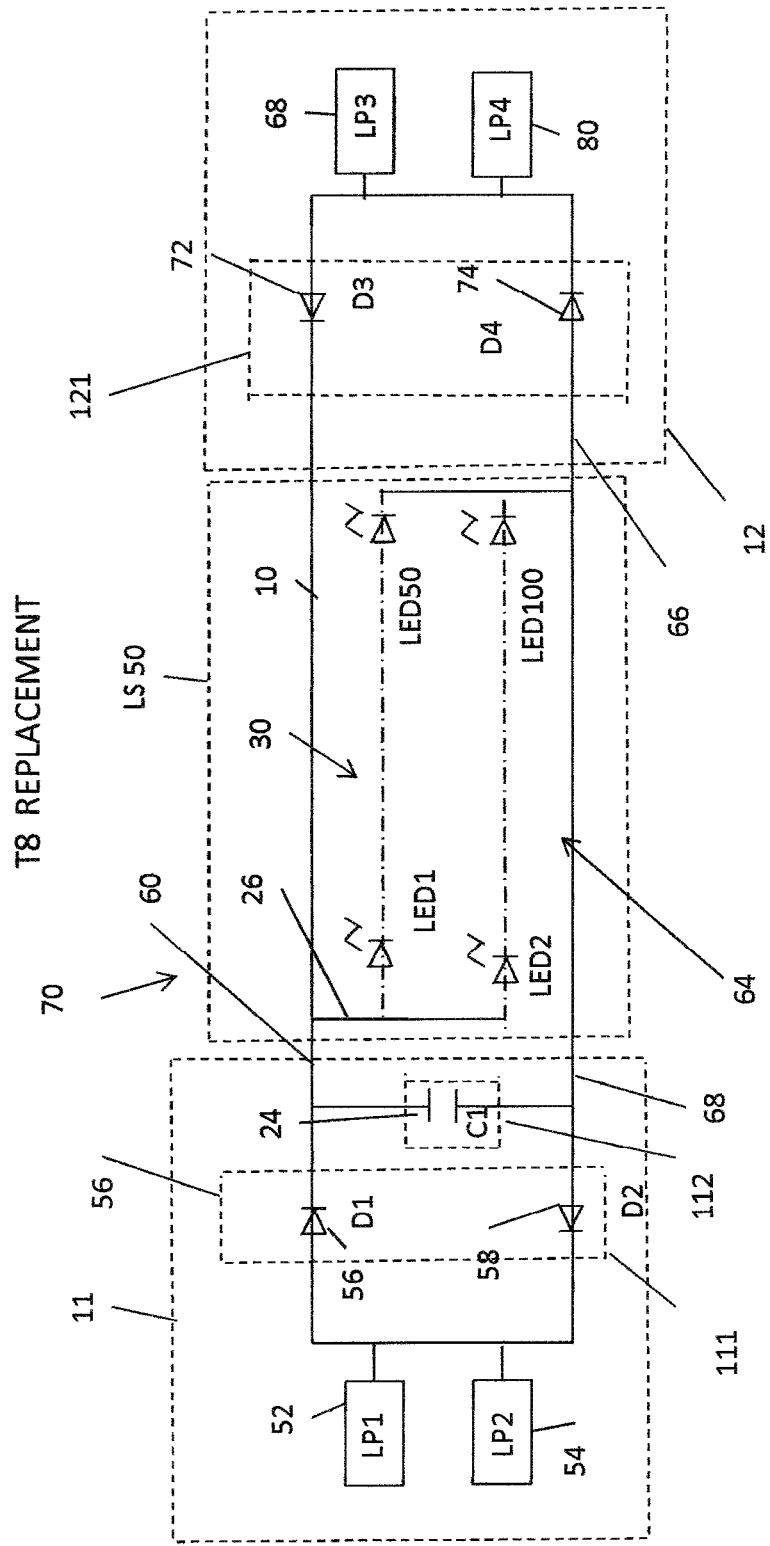
FIG. 4 is a schematic diagram of the circuit of an LED retrofit lamp according to the first embodiment of the present invention with M being 28 and N being 5.

Referring to FIGS. 2, 3 and 4, a LED retrofit lamp 70 operating directly with a high frequency ballast, not shown, comprises an LED lamp LS load 50, replacing the original fluorescent lamp in the fluorescent lamp holders 17 and 19 for illumination, and connecting to the first and second connection terminals 13 of the LED load LS 60 and 68, respectively. The ballast on the fluorescent lamp holder connects to the first and second connection terminals 60 and 66 and takes a high-frequency, high-voltage constant current source, changes the input voltage current value into the said LED load LS 50, and matches with the LED lamp to adjust the light output.

The first end 11 of the lamp circuit comprises of the first lamp pin LP1 52 and a second lamp pin LP2 54 that are used to connect to the ballast's first lamp connection terminal 16, FIG. 1; the first rectifying circuit 111 converts the alternating current output from the ballast 14 into direct current via reversed diodes 56 and 58. The filter circuit 112 regulates an unstable voltage output from the ballast 14, and one end of the first rectifying circuit 111 has a connecting wire coupled to the first lamp pin LP1 52 and the second lamp pin LP2 54, the other end of the first rectifying circuit 111 has a connecting wire coupled to the first connecting terminal 60 of the LED load LS 50 and the second connecting terminal of the LED load LS 66, one end of the filter circuit 112 has a connection wire coupled to the first connection terminal 60 of the LED load LS 50, the other end of the filter circuit 112 has a connection wire coupled to the second connection terminal 66 of the LED load LS 50; the second lamp end circuit 12 comprises a third lamp pin LP3 72 for connecting to a second lamp connection terminal 60 of the ballast and a fourth lamp pin LP4 74 and a second rectifier circuit 121 for converting the alternating current output of the ballast, the second rectifier circuit 121 has a connection wire coupled to the third lamp pin LP3 68 and the fourth lamp pin LP4 80, and the other end of the second rectifier circuit 121 has a first connection terminal 60 coupled to the LED load LS 50 and the load connection of the second connection terminal 66 of the LED load LS 50.

Compared with the prior technology, this invention uses an LED load 50 to replace the fluorescent lamp tube, by removing the fluorescent lamp tube from the fluorescent lamp holder, and inserting an LED lamp with the fluorescent lamp ballast into the lamp holder, the first rectifier and the second rectifier form a bridge, converting the high-frequency alternating current into a high-frequency direct current; at this time the voltage is very unstable, thus it is filtered through the filter circuit 112 to achieve voltage regulation. Different ballasts give different voltage values; at this point the LED load uses different series and parallel connections, thereby achieving the present invention in which the LED load can replace any type of fluorescent lamp. The LED retrofit lamp of the present invention can be used along with fluorescent lamp ballast, the ballast changes the current or voltage, and the light intensity of the LED load changes. In this invention, the light-emitting diode in the LED load is small in resistance, can withstand voltage changes, and has good stability and a long life span. Has the same light brightness conditions, and retains the same ballast in the fluorescent lamp; comparing replacing the lamp tube with the LED retrofit lamp, and the new type LED tube that replaces both the fluorescent tube and the ballast. It saves manpower as well as reduces product costs. At the same time, under the same light brightness conditions, this LED lamp invention can save more than 50% of electricity, which is beneficial to saving energy and helping the environment.

In the present embodiment, the LED load LS 50 includes a number of LED chips 30 in series, and this series of LED chips are electrically connected in parallel, and the parallel LED chips are connected at one end to the first connection terminals, and the other end leads to the connection wire of the second connection terminal. As seen in FIG. 2, the LED chips 30 are represented by dashes between two diodes. Different ballasts give different voltage values, at this point, the LED load LS uses different series and parallel connections combinations, in series or tandem to bypass, and parallel to divide the voltage; different ballast settings are used for different series and parallel connections, so that the LED Load LS can replace any type of fluorescent tube.

In the present embodiment, the first rectifying circuit 111 includes a first diode D1 and a second diode D2, the input end of the first diode D1 is connected to the first lamp pin LP1 and the second lamp pin LP2; the output end of the diode D2 is connected to the first connection terminal of the LED load LS; the input terminal of the second diode D2 is connected to the second connection terminal of the LED load LS; the output terminal of the second diode D2 is connected to the output terminal of the second diode D2; lamp pin LP1 and second lamp pin LP2 are connected. The filter circuit 112 includes a capacitor C1, one end of the capacitor C1 is connected to the first connection terminal of the LED load LS, and the other end of the capacitor C1 is connected to the second connection terminal of the LED load LS. The second rectifier circuit 121 includes a third diode D3 and a fourth diode D4, the input terminal of the third diode D3 is connected to the third lamp pin LP3 and the fourth lamp pin LP4, the output end of the third diode D3 is connected to the first connection terminal of the LED load LS; the input end of the fourth diode D4 is connected to the second connection terminal of the LED load LS, the output end of the fourth diode D4 and the third lamp pin LP3 and the fourth lamp pin LP4. The first rectifier circuit 111, the second rectifier circuit 121, and the filter circuit 112 of the present invention have a simple structure and are easy to use and do not use a lot of space at both ends of the lamp holder and do not affect the normal use of the lamp at all.

The First Embodiment

As shown in FIG. 4 with respect to the letters M 90 and N 92 on the LED load 50, the LED lamp directly replaces the most conventional commercial T8 fluorescent tube F32T8 with design description for the present invention: Normal fluorescent lamp F32T8 32 W lamp ballast output parameters are: lamp operating current of 0.175 A+/−5%, lamp operating voltage of 143.6V+/−5%, frequency of 42.3 KHz+/−5%, the length of the lamp is 48", the diameter of the lamp is 1" (25.4 mm). (2) To make a 22 W T8 LED lamp replacement for a fluorescent 32 W T8 lamp, the same LED lamp input voltage of 143.3V, input current of 0.175 A and frequency of 42.3 KHz will be needed. Rectifier diodes and a voltage regulator capacitor input design are used to make the input nearly the DC input voltage of 143.3V with an input current of 0.175 A. If using LED white light lamp beads of 3V/150 mA, we need to ensure that the actual low light degradation of the LED lamp beads will have an output of at least 50 to 60%; so the LED lamp beads replacing the tube cannot be only 1, it should be at least 2 (since the input current of the LED lamp is 175 mA which is greater than the LED lamp operating current of 150 mA) thus allowing the current flowing through the lamp beads is at a level of 175 mA/2=88 mA level. For the number of series needed to ensure that the LED Normal operating voltage is at the 3V level, we can choose 143.3/3=48 or 50 in parallel, so for LED lamp beads with the output power of 3V×88 mA=0.265 W, we can choose to use 0.5 W LED light bead numbers 2835, 5730 or 5050 to replace the lamp tubes. The number of M shown in FIG. 4 is 50, the number of N is 2; the LED lamp can be composed of four diodes, a capacitor, 100 0.5 W LED lamp beads, circuit board with 48" long T8 lamp kit. The following schematic diagram shows LP1 and LP2 for one end cap of the LED lamp, LP3 and LP4 are two lead pins for the other end of the LED lamp, which can replace the fluorescent lamp and work with instantaneous start, quick start and program start ballasts.

The Second Embodiment

Figure 5:
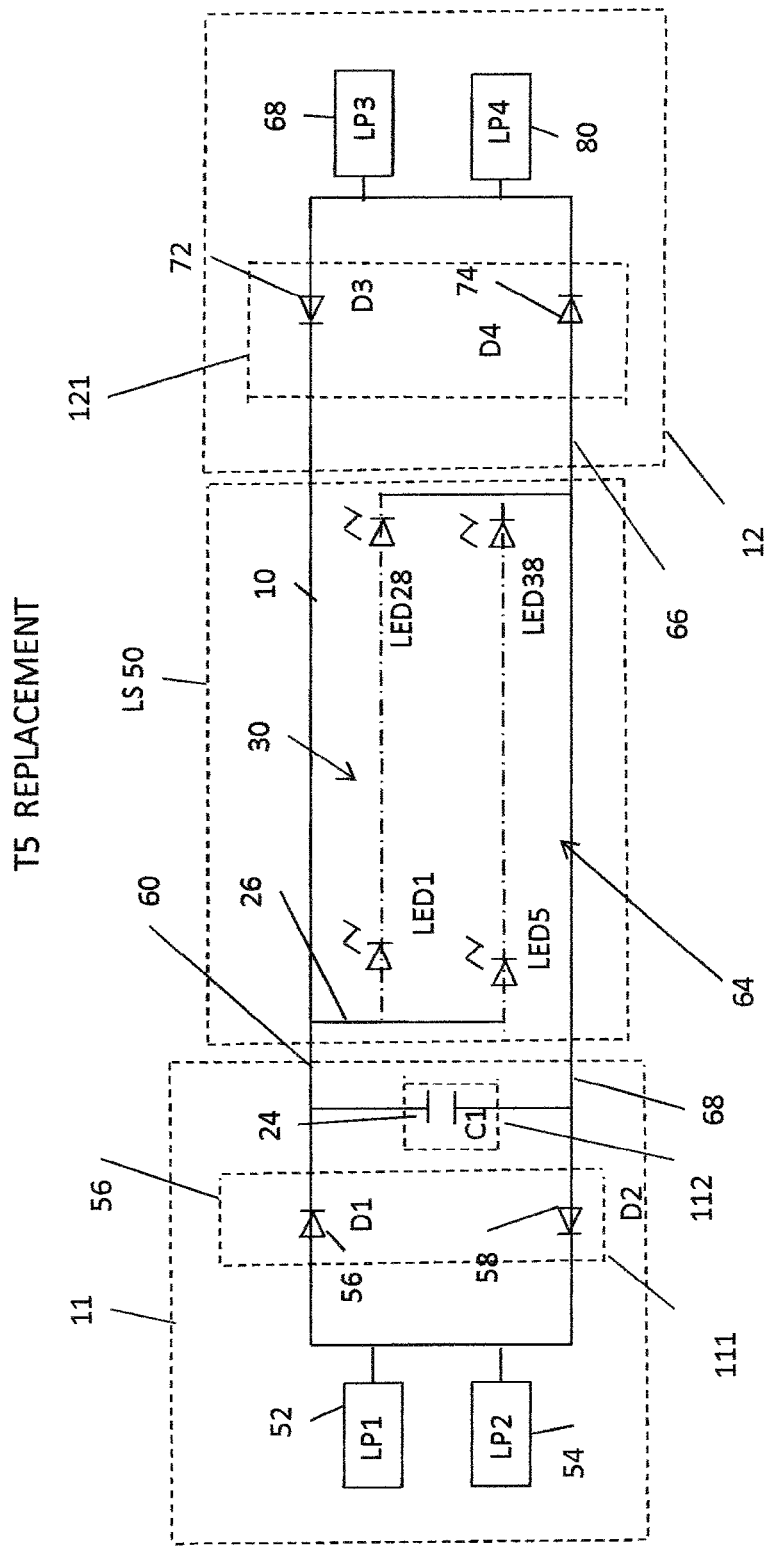
FIG. 5 is a schematic diagram of the circuit of an LED retrofit lamp according to a second embodiment of the present invention with M as 28 and N as 5.

FIG. 5 shows the LED lamp directly replacing the conventional commercial T5 fluorescent tube F28T5 design for the present invention: Normal fluorescent lamp F28T5 28 W lamp ballast output parameters are: lamp operating current of 0.168 A+/−5%, lamp operating voltage of 85V+/−5%, frequency of 42.3 KHz+/−5%, the length of the lamp is 46", T5 lamp diameter of 5/8" (15.88 mm). Using a 14 W T5 LED lamp to replace a fluorescent 28 W T5 lamp, the same LED lamp input voltage is 85V, input current is 0.168 A, and frequency is 42.3 KHz. Rectifier diodes and a voltage regulator capacitor input design are used to make the input nearly the DC input voltage of 191.6V and input current of 0.168 A. If using LED white light lamp beads of 3V/60 mA, we need to ensure that the actual low light degradation of the LED lamp beads will have an output of at least 50 to 60%; so the LED lamp beads replacing the tube cannot be less than 3 and for safety reasons we use 5, (because the LED lamp current input current of 168 mA is greater than the LED lamp beads operating current of 60 mA by three times, hence we use 5 times for safety). This makes the current flowing through the lamp beads at 168 mA/5=33.6 mA Level, and for the number of series, in order to ensure the normal working voltage of the LED is at the 3V level, we can choose 85/3=28 or 30 in parallel; so for LED lamp beads with the output power of 3V×33.6 mA=0.1 W, we can choose to use 0.2 W LED light bead numbers 2835 or 3014 or other LED beads to replace the lamp tubes. The number of M shown is 28, the number of N is 5 in FIG. 5; the LED lamp can be composed of four diodes, a capacitor, 140 0.2 W LED lamp beads, circuit board with 46" long T5 lamp kit. The following schematic diagram shows LP1 and LP2 for one end cap of the LED lamp, LP3 and LP4 are two lead pins for the other end of the LED lamp, which can replace the fluorescent lamp and work with instantaneous start, quick start and program start ballasts.

The Third Embodiment

Figure 6:
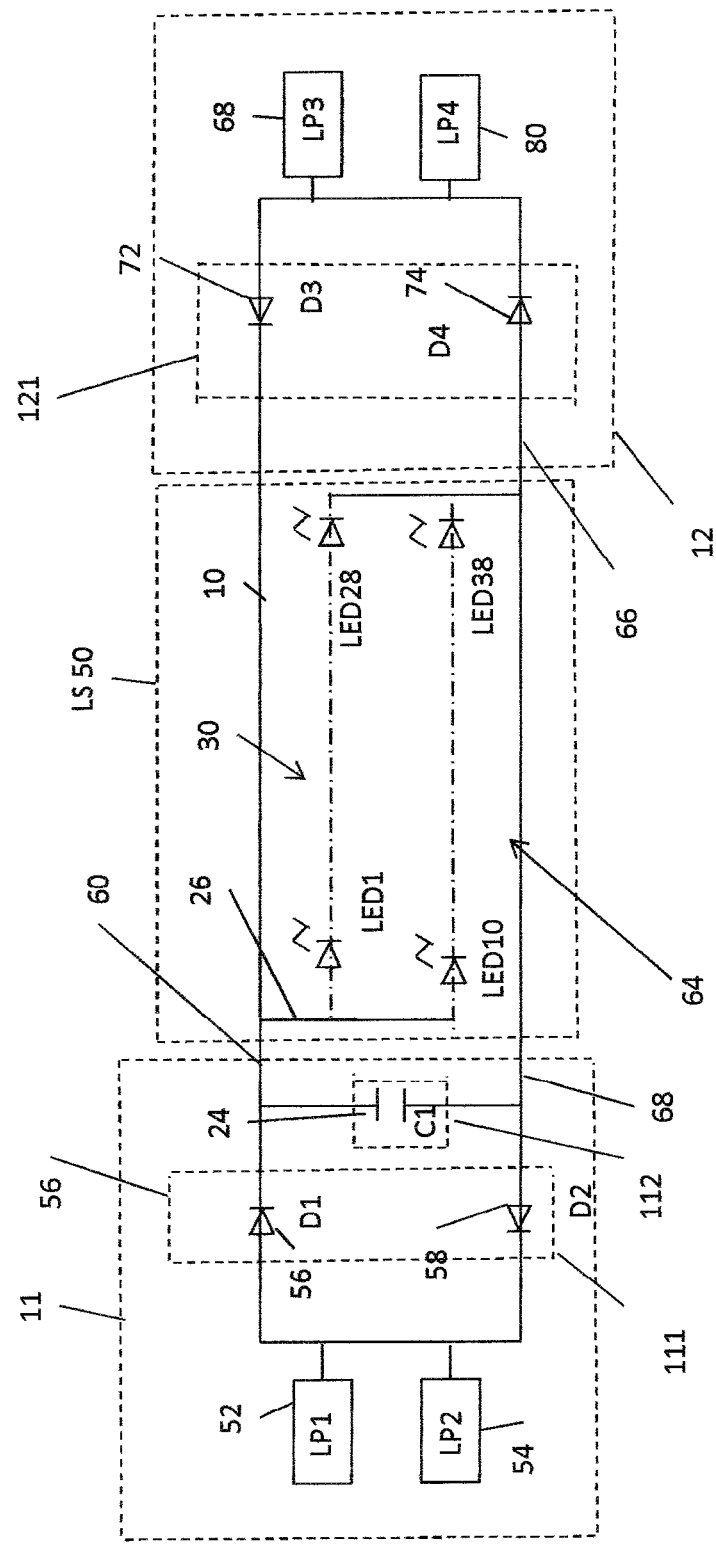
FIG. 6 is a schematic diagram of the circuit of an LED retrofit lamp according to a third embodiment of the present invention with M 28 and N 10.

FIG. 6 shows the LED lamp directly replacing the conventional commercial T12 fluorescent tube F48T12HO design instructions for the present invention:

Normal fluorescent lamp F48T12HO 65 W lamp ballast output parameters are: lamp operating current of 0.8 A+/−5%, lamp operating voltage of 82V+/−5%, frequency of 42.3 KHz+/−5%, the length of the lamp is 46", the diameter of the lamp is 1.5" (38.1 mm). Using a 36 W T12 LED lamp to replace a fluorescent 65 W T12HO lamp, the same LED lamp input voltage is 82V, input current is 0.8 A, and frequency is 42.3 KHz. Rectifier diodes and a voltage regulator capacitor input design are used to make the input nearly the DC input voltage of V and input current of 0.8 A. If using LED white light lamp beads of 3V/150 mA, we need to ensure that the actual low light degradation of the LED lamp beads will have an output of at least 50 to 60%; so the LED lamp beads replacing the tube cannot be less than 5 and for safety reasons we use 10, (because the LED lamp current input current of 168 mA is greater than the LED lamp beads operating current of 60 mA by three times, hence we use 10 for safety). This makes the current flowing through the lamp beads at 800 mA/10=80 mA level, and for the number of series, in order to ensure the normal working voltage of the LED is at the 3V level, we can choose 82/3=28 or 30 in parallel; so for LED lamp beads with the output power of 3V×80 mA=2.4 W, we can choose to use 0.5 W LED light bead numbers 2835, 5730 or 5050 to replace the lamp tubes. The number of M shown is 28, the number of N is 10 in FIG. 6; the LED lamp can be composed of four diodes, a capacitor, 280 0.2 W LED lamp beads, circuit board with 46" long T12 lamp kit. The following schematic diagram shows LP1 and LP2 for one end cap of the LED lamp, LP3 and LP4 are two lead pins for the other end of the LED lamp, which can replace the fluorescent lamp and work with instantaneous start, quick start and program start ballasts.

While only a few specific embodiments of the present invention have been disclosed, the present invention is not limited thereto, and any changes that people who understand the process are intended to fall within the scope of the present invention.

It is further contemplated that numerous fluorescent applications can be replaced with this invention including roadside business signs, gas station signs, and the like. The LEDs in the present invention can be double-sided which the prior art does not show. Being self-ballasted does not allow for double-side LEDs due to space and other limitations. Other applications include under cabinet lights, and residential lighting.

As claimed, a LED retrofit lamp for replacing a fluorescent tube and works directly with a high frequency ballast in a fluorescent fixture, the retrofit LED lamp comprises a first and second connection terminals (13) of said LED retrofit lamp (15), the terminals (13) being capable of mounting in a pair of fluorescent lamp holders (17/19) in the fixture, an input lamp holder (17) connects to 'the first connection terminal (13) of 'the LED lamp (15); a ballast (14) of the fixture connects to 'the first and second connection terminals (13), the ballast (14) providing a high-frequency voltage to 'the LED retrofit lamp (15), 'the LED retrofit lamp (15) converting 'the high-frequency voltage and alternating current from the ballast (14) into a constant current source and voltage to match a LED load (50) of 'the LED retrofit lamp (15) to provide a predetermined light output, further a first end of a LED retrofit lamp circuit (11) comprises first and second lamp pins (52/54) that are used to connect to the ballast's first connection terminals (/19)17; a first rectifying circuit (56) for converting 'the alternating voltage and current output from the ballast (14) into a direct unstable voltage and current, 'the first rectifying circuit (11) coupling with the connection wires of a first and second lamp pins (52/54); a first filter circuit (112) for regulating 'the unstable voltage output from the ballast ('14), one end of 'the first filter circuit (112) has a coupling with a connecting wire connected to a first connecting terminal (60) of a LED load (50), the other end of the first filter circuit (112) is coupled with a connecting wire to a second connecting terminal (68) of the LED load (50); the LED load (50) being a combination of serial and parallel LED chips (30) to produce a desired light output for a particular fluorescent lamp; a second end of the lamp circuit (12) comprising third and fourth lamp pins (68/80) for connecting to the ballast's second lamp connection terminal (19); and a second rectifying circuit (121) for converting the direct current and voltage output from the LED load (50) into alternating voltage and current for the ballast (14), one end of the second rectifying circuit (121) is coupled with a connecting wire to the third and fourth lamp pins (68/80), and the other end of the second rectifier circuit (121) is coupled to the LED load's first and second connection terminals (60/68).

The method of the present invention for transforming a LED retrofit lamp to operate in a fluorescent fixture comprises the steps of: calculating how to connect and arrange the LED retrofit lamps in parallel with an LED load therein, according to the source of the voltage and current of the fluorescent lamp ballast; arranging a first rectifying circuit, a second rectifying circuit, and a filtering circuit of the LED retrofit lamp to convert the ballast voltage and current to operate the LED load; identify the first, second, third and fourth lamp pins, and connecting the lamp pins, respectively, with the lamp connection terminals of the ballast; arranging the first rectifying circuit between the first lamp pin, second lamp pin and the LED load; arranging the second rectifying circuit between the third lamp pin, the fourth lamp pin and the LED load; arranging the filter circuit between the first rectifier circuit and the LED load; removing the fluorescent lamp tube from the fluorescent lamp holder; and inserting the first lamp, the second lamp, the third lamp and the fourth lamp pins into the corresponding lamp holder sockets and thus enabling the LED load and ballast within the fluorescent lamp ballast to match and operate.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for transforming a LED retrofit lamp to operate in a fluorescent fixture with a ballast, said method comprising the steps of:

calculating how to connect and arrange the LED retrofit lamps in parallel with an LED load therein, according to the source of the voltage and current of the fluorescent lamp ballast, said LED load being a combination of series chips that are then connected in parallel;

arranging a first rectifying circuit, a second rectifying circuit, and a filtering circuit of said LED retrofit lamp to convert the ballast voltage and current to operate the LED load;

identify the first, second, third and fourth lamp pins, and connecting said lamp pins, respectively, with the lamp connection terminals of the ballast;

arranging the first rectifying circuit between the first lamp pin, second lamp pin and the LED load;

arranging the second rectifying circuit between the third lamp pin, the fourth lamp pin and the LED load;

arranging the filter circuit between the first rectifier circuit and the LED load;

removing the fluorescent lamp tube from the fluorescent lamp holder; and inserting the first lamp, the second lamp, the third lamp and the fourth lamp pins into the corresponding lamp holder sockets and thus enabling the LED load and ballast within the fluorescent lamp ballast to match and operate and further comprising the steps of:

A organizing said LED load chips in series and then connecting in parallel with different quantities to replace a T8 fluorescent tube;

determining the T8 operating output parameters;

determining the LED load input parameters to be substantially similar to the T8 output parameters, the input parameters being voltage, current, and frequency with an input voltage of approximately 143 volts and with an input current of approximately 0.175 amps being DC;

using LED white lamp chips of 3V and 150 mA and 0.5 watts;

adjusting the output to be about 50 to 60%;

determining the number of serial LED chips in a pair of parallel circuits to be 50 and 100; and repeating the above for T5, T10, and T12 lamps with appropriate values therein.

* * * * *